INVENTOR.
R. E. STARK

3,730,772
Patented May 1, 1973

3,730,772
SEPARATOR FOR ELECTROCHEMICAL CELLS AND PROCESS OF MAKING SAME
Robert E. Stark, Littleton, Colo., assignor to The Gates Rubber Company, Denver, Colo.
Filed Nov. 3, 1971, Ser. No. 195,385
Int. Cl. H01m 3/04
U.S. Cl. 136—30
12 Claims

ABSTRACT OF THE DISCLOSURE

A unitary separator for use in alkaline electrochemical cells is described and includes a bibulous layer impregnated with a gelling agent, the bibulous layer having along its thickness an inner zone containing a relatively high concentration of gelling agent flanked by two outer zones extending to the surface of the bibulous layer and containing a relatively low concentration of gelling agent. A method for producing such a separator is also disclosed and comprises impregnating the bibulous layer with the gelling agent and withdrawing at least a portion of the gelling agent from the outer surfaces of the bibulous layer to form the desired separator. The separator offers advantages in ease of handling and resistance to dendrite penetrations.

BACKGROUND OF THE INVENTION

This invention relates to separators for use in electrochemical cells, and particularly for use in cells having electrode systems such as nickel-cadmium, nickel-zinc, silver-zinc, and manganese dioxide-zinc, in which the separator must be highly resistant to physical and chemical influences within the cell.

It has heretofore been comon practice in the art of certain secondary alkaline cells to employ inter-electrode separators containing a plurality of layers, at least one of which is a membranous material such as cellophane. This membrane layer must be compatible with the alkaline electrolyte in the cell, and be sufficiently permeable to allow passage of the electrolyte ions, but not be so highly permeable as to readily permit the passage of other materials, e.g., electrode-derived conducting substances. Such membranous materials are particularly useful (though not so limited) in attenuating the growth of zinc dendrites in alkaline rechargeable cells having zinc as the basis of the negative electrode. These dendrites or "trees" are produced and propagated from the zinc electrode along electrolyte wetted paths during charge, and produce tree-like conductive branches which may eventually penetrate the separator and extend to the cathode, short out the cell and seriously reduce its life.

While semi-permeable membranous materials such as cellophane do retard such adverse metallic conduction between the electrodes of rechargeable alkaline cells, one disadvantage has been the relatively fragile character of such membranes. Even slight creasing, curling in response to humidity changes, or slight punctures or other discontinuities in the membrane will readily permit dendrite penetrations. The possibility that any fold, crease or any other discontinuity will occur is greatly increased when the membrane is handled or when there is relative freedom of movement between the one or more membrane layers, contiguous separator layers, and adjacent electrodes within the cell.

The most pertinent prior art may be found in United States Patent Office classification Class 136, Batteries. Examples of the state of the prior art include the following patents: 2,872,479 (Beckvold); 3,288,642 (Kordesch); 3,445,738 (Ruben); and Canadian Pat. No. 721,-815.

In one aspect of this invention it is an object to produce a novel single-layer separator in which the use of relatively fragile membranous layer(s) is obviated entirely.

It is another object of this invention to produce a separator resistant to dendrite penetration therethrough.

It is a further object to provide a separator of bibulous material impregnated in a selective manner with a gelling agent to retard dendrite penetration and circumvention by "bridging" across the inter-electrode gap around the edge of the separator.

These and other objects are met and the disadvantages of the prior art are solved by employing the separator and its method of preparation according to the present invention as described herein.

SUMMARY OF THE INVENTION

Briefly described, one aspect of the invention includes a separator for electrochemical cells including a single bibulous separator layer impregnated with a gelling agent, defined herein. The impregnated bibulous sheet is so treated that the resultant separator will consist of a single-layer with three zones across its thickness: two outer substantially gell-free bibulous zones and an inner gel impregnated zone. The inner gel zone acts analogously to a sandwiched semi-permeable membranous layer in retarding undesirable growths; the outer zones readily take up electrolyte and permit electrochemical reactions with their adjacent electrodes.

In another aspect of the invention, a method for preparing such a separator is described and includes the steps of impregnating a single bibulous layer of material with a gelling agent and withdrawing at least a portion of the gelling agent from the surfaces of the bibulous layer in a manner so as to leave an inner gel impregnated zone.

BRIEF DESCRIPTION OF THE DRAWINGS

The invention will be more readily understood by reference to the accompanying drawings, in which like numerals designate like parts in the several figures, and wherein.

PREFERRED EMBODIMENTS OF THE INVENTION

Figure 1:
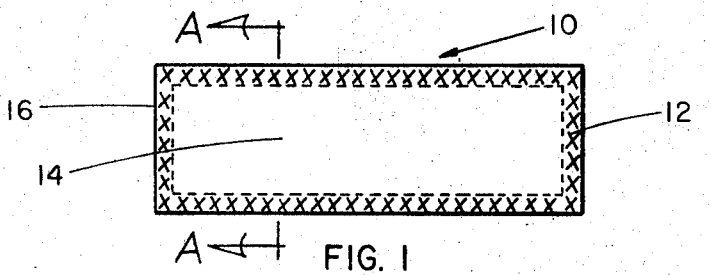
FIG. 1 is a plan view of a preferred separator of the invention.

Referring to FIG. 1 the separator of the present invention is generally designated at 10 and comprises a thin bibulous layer 16 whose contour is defined by a marginal edge portion 12 surrounding an inward body 14. By bibulous is meant that the separator layer is highly absorbent and retentive of the electrolyte utilized, and preferably retains electrolyte (by way of example, in 35% KOH) in the amount of from about 0.55 to about 0.95 and more preferably from about 0.7 to about 0.95 gram of electrolyte per cubic centimeter of separator. It is further important that the bibulous layer be mechanically strong and resistant to degradation within the cell environment. In an alkaline cell, of course, the bibulous layer must be compatible with the alkaline electrolyte, e.g., potassium hydroxide.

Examples of useful bibulous materials include natural or synthetic felted or woven cellulosic materials exemplified by rayon, wood pulp, cotton linters, paper materials such as porous and microporous filter papers, or cellulosic esters such as fibrous cellulose acetate, etc. Many non-cellulosic materials are also useful and include such materials as pressed styrene fibers, nylon, Pellon (manufactured by the Pellon Corp.) glass fiber, polyethylene, treated polytetrafluoroethylene, acrylics such as Orlon and Acrylan, polyacrylonitrile, and polyesters such as Dacron. Particularly preferred separators for use in alkaline cells which retard dendritic penetration are fibrous cotton based cellulosic materials having a degree of polymerization preferably of at least about 3500, and more preferably at least about 7500. (See High Polymers, vol. V, "Cellulose and Cellulose Derivatives," Interscience Publishers, 1954.) By degree of polymerization is meant the average number of anhydroglucose units per molecule.

A further requirement of the particular bibulous layer employed is that it be compatible with and readily impregnatable with gelling agent, hereinafter defined.

Figure 3:
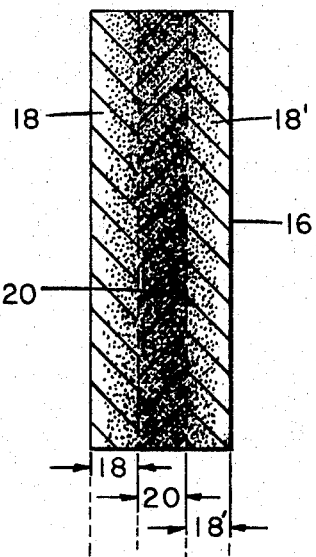
Figure 5:
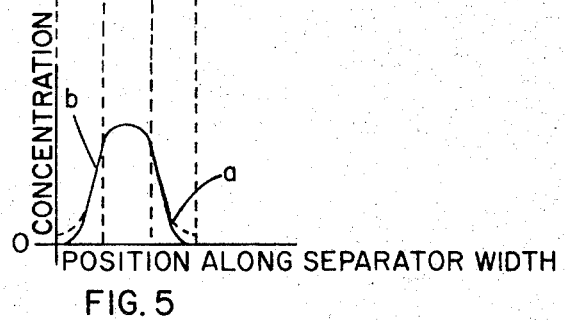
FIG. 5 is a graph of examples of the concentration of gelling agent with respect to position along the separator thickness as depicted in FIG. 3.

In one embodiment of the invention, shown in FIG. 3, an edge view of the separator depicts the construction of the separator along its thickness. As is shown, bibulous layer 16 consists of a single layer divided into three generally uniform zones: two outer bibulous zones 18 and 18′ having relatively low gel concentrations, sandwiching inner zone 20 of high gel concentration. The gelling agent is shown schematically as a plurality of dots. Preferably the concentration of gelling agent in the inner zone 20 is sufficient to retard unfavorable growths in the electrochemical cell, and the concentration then diminishes outwardly in the direction of the surfaces of the bibulous layer 16 until the outer portions of zones 18 and 18′ are essentially free of gelling agent. Two illustrative examples of preferred relationships of gelling agent concentration versus the position along any separator cross-sectional width or thickness are shown graphically in FIG. 5 as curves "a" and "b."

Figure 4:
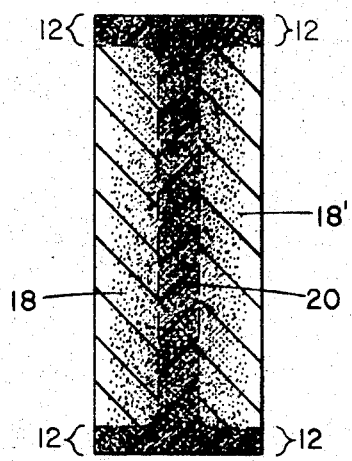

In FIG. 4 the marginal edge 12 like the inner gel zone 20, is impregnated with a relatively high concentration of gelling agent to present an edge barrier to substantially reduce electrolyte ion mobility along and through this edge. Other means may be utilized to render the marginal portion 12 resistant to ion penetration such as by masking the edge portion, applying a coating of a hydrophobic material, such as polytetrafluoroethylene, to the portion 12 by irradiating the marginal portion 12, or by other means readily appreciated by those skilled in the art. The purpose for rendering the edge resistant to electrolyte ion penetration is to discourage dendritic and other unfavorable growths from penetrating the inter-electrode space in the electrochemical cell by circumventing or "bridging" over the edge of the separators via an electrolyte wetted path.

The gelling agents in the present invention serve the purpose of providing a barrier film or semi-permeable membrane through which ions do permeate (although their mobility and concentration may be reduced) but through which electrode-derived materials are substantially impermeable. In general, the gelling agent must be compatible with and substantially immobile and insoluble in cell electrolyte (although some solubility is permitted as long as mobility is minimal), resistant to oxidation, and capable of being impregnated within and adhering to the single bibulous layer. Preferred gelling agents of the present invention are hydrophylic polymers which readily form gels and offer a relatively low internal resistance to electrolyte flow.

While a large variety of gelling materials satisfy the aforementioned requirements, examples of suitable materials include cellulose esters, exemplified by cellulose acetate propionate; carboxymethylcellulose and its salts, preferably alkali metal salts; cellulose ethers exemplified by lower alkyl ethers, including methyl (Methocel) and ethyl (Ethocel) and carbocyclic including benzyl ethers; other cellulosic compounds exemplified by hydroxypropyl methyl cellulose and regenerated cellulose materials; vinyl esters exemplified by vinyl acetate and its copolymers; salts of alginic acid, preferably alkali metal salts; additional miscellaneous compounds exemplified by rubber latex resin, silicates, ammonium lignosulfonate containing wood sugars, starch, hydrated fuller's earth, ovalbumin, guargum, polyvinyl alcohol, polyethylene oxide and polyacrylic acid. Additional battery membrane-like separator materials which have the required gelling and compatibility characteristics are also useful, will be appreciated by those skilled in the art and are meant to be incorporated within the scope of this invention.

Figure 2:
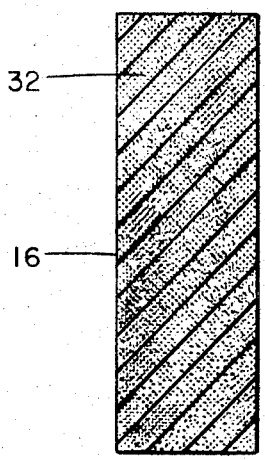
FIGS. 2, 3, and 4 are sectional views of the separator of FIG. 1 taken generally along section A—A showing different stages of development of the separator together with certain alternative embodiments.
Figure 6:
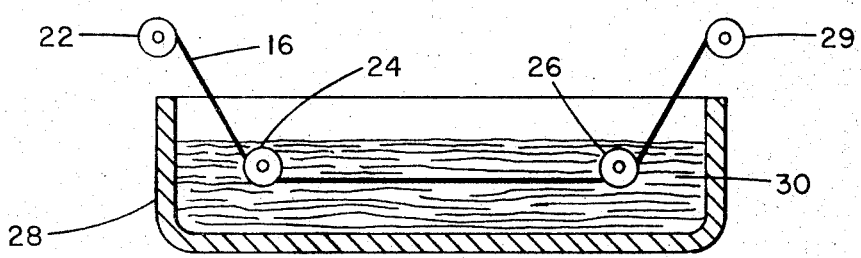
FIG. 6 depicts apparatus for carrying out a portion of the method of the present invention.

A suitable method for preparing separators of the present invention includes the steps of impregnating the bibulous layer with the gelling agent, followed by withdrawing, e.g. as by leeching, at least a portion of the gelling agent from the outer zones 18 and 18′ of the bibulous layer 16 while controlling the withdrawal step to maintain a highly concentrated inner zone 20 retaining a major proportion of impregnated gelling agent. Thus, in FIG. 6 a roll 22 of a long thin sheet of bibulous material 16 is fed under rollers 24 and 26 mounted and submerged in a tank 28 containing gelling agent 30 in solution. The bibulous layer is immersed within and impregnated with the gelling agent substantially througout the pores or interstices of the bibulous material and collected on roll 29. Schematically, a cross section of the bibulous layer 16 is shown in FIG. 2 with the generally equally distributed masses of gelling agent 32. A variety of means other than roll dipping may be used to impregnate the bibulous sheet, such as spraying, or brushing. Advantageously, the impregnation step may be accomplished under the influence of vacuum to free the pores of the bibulous layer for ease of impregnation.

After impregnation, it is preferred to allow the impregnated bibulous sheet to dry, either under ambient temperature or elevated temperatures. As a modification, the separator having the configuration of FIG. 4 may be produced by selectively drying the marginal edges 12 of the separator at a faster rate than the inner body 14. By applying higher heat to the marginal edges, the gelling agent along this portion selectively loses a greater amount of entrapped or bonded water or other solvent molecules than the inner portion of the separator. Thus, subsequently when the impregnated bibulous layer is subjeected to the leeching operation, the wetter body portion 14 will more quickly dissolve and be discharged from the outer zones 18 and 18′ than from the drier marginal zones 12 which will be slower to dissolve in the leeching medium.

The impregnated bibulous layer may be leeched, for instance, by immersion in a suitable solvent which will tend to dissolve the gelling agent. By controlling such variables as temperature and dwell or residence time, the extent to which dissolution of gelling agent occurs may be controlled so that only the outer zones 18 and 18′ are rid of any substantial amount of gelling agent.

While a drying technique has been described for obtaining the separator configuration in FIG. 4, it will readily be seen that a number of other means may be employed to obtain high gel concentration along the marginal zone 12. Thus, the marginal zone could be masked prior to leaching, or otherwise rendered non-electrolyte-wetting such as by edge treating with paraffin, tetrafluoroethylene, or other hydrophobic material. Radiation treatment of the edge is also suitable to retain the high gel concentration zone along the marginal portion of the separator.

It should be understood that the invention is capable of a variety of modifications and variations which will be made apparent to those skilled in the art by a reading of the specification and which are to be included within the scope of the claims appended hereto. For instance, while a preferred gel concentration distribution has the characteristics shown in FIG. 5, other symmetrical (or non-symmetrical) distributions would also be suitable, such as where substantially all of the gelling agent is in zone 20 and little if any is found in the outer zones 18 and 18'. A further modification would be to employ a plurality of separator layers in the inter-electrode space, each individual layer consisting of a gel-impregnated bibulous material made according to the invention.

What is claimed is:

1. A unitary separator for use in alkaline electrochemical cells comprising a bibulous layer impregnated with a gelling agent, said bibulous layer having along its thickness an inner zone containing a relatively high concentration of the gelling agent flanked by two outer bibulous zones extending to the surface of the bibulous layer and containing a relatively low concentration of gelling agent.

2. The separator of claim 1 wherein the concentration of gelling agent increases from a value of approximately zero at the outer surfaces of the bibulous layer to a maximum value at the center portion of the bibulous layer sufficient to inhibit penetration of conductive growths within a cell incorporating the separator.

3. The separator of claim 1 wherein all but the marginal edge taken along the outer perimeter of said bibulous layer contains said zones of varying gelling agent concentration.

4. The separator of claim 3 wherein said zones of concentration are substantially uniform throughout the separator, excluding said marginal edges.

5. The separator of calim 3 wherein the marginal edges of said bibulous layer are rendered substantially resistant to ion penetration.

6. The separator of claim 5 wherein the marginal edges are rendered resistant to ion penetration by thoroughly impregnating the edges with said gelling agent.

7. In an alkaline rechargeable electrochemical cell having at least one positive electrode and at least one zinc-containing negative electrode sandwiching an included separator, the improvement comprising utilizing within the cell the separator defined according to claim 1.

8. A process for preparing a unitary separator suitable for use in an electrochemical cell comprising the steps of:
   (a) impregnating with a gelling agent a single bibulous layer of material; and
   (b) withdrawing at least a portion of said gelling agent from the outer surfaces of the bibulous layer, while retaining impregnated gelling agent within the inner portion of the bibulous layer.

9. The process of claim 8 wherein the configuration of said separator is defined by a marginal edge and an inner body portion and wherein an additional step compromises:
   (c) rendering said marginal edge substantially resistant to ion penetration.

10. The process of claim 8 wherein step (b) is accomplished by leeching gelling agent from said outer surfaces under controlled temperature and duration of leeching.

11. The process of claim 9 wherein step (b) is accomplished by leeching gelling agent from said outer surfaces within the inner body portion of said separator.

12. The process of claim 11 wherein the marginal edges are rendered substantially resistant to ion penetration by selectively subjecting them to an elevated heat treatment prior to leeching, said leeching performed for a sufficient period of time to leech gelling agent from said outer surfaces within the body portion but substantially exclusive of said marginal edge.

References Cited

UNITED STATES PATENTS

| 2,890,261 | 6/1959 | André | 136—145 |
| 3,573,106 | 3/1971 | Johnson et al. | 136—145 |
| 3,669,746 | 6/1972 | Divitt et al. | 136—145 |

FOREIGN PATENTS

| 451,628 | 8/1936 | Great Britain | 136—145 |

DONALD L. WALTON, Primary Examiner

U.S. Cl. X.R.

136—145, 148